(12) United States Patent
Won et al.

(10) Patent No.: US 9,030,160 B2
(45) Date of Patent: May 12, 2015

(54) CHARGING METHOD OF MULTI-NODE WIRELESS CHARGING SYSTEM USING MAGNETIC FIELD COMMUNICATION

(75) Inventors: Yun Jae Won, Gyeonggi-do (KR); Seung Ok Lim, Gyeonggi-do (KR); Yeon Kug Moon, Gyeonggi-do (KR); Sun Hee Kim, Seoul (KR); Kyu Sung Hwang, Gyeonggi-do (KR)

(73) Assignee: Korea Electronics Technology Institute, Seongnam-si (KR)

( * ) Notice: Subject to any disclaimer, the term of this patent is extended or adjusted under 35 U.S.C. 154(b) by 392 days.

(21) Appl. No.: 13/307,263

(22) Filed: Nov. 30, 2011

(65) Prior Publication Data

US 2012/0169293 A1 Jul. 5, 2012

(30) Foreign Application Priority Data

Dec. 30, 2010 (KR) ........................ 10-2010-0139395

(51) Int. Cl.
*H02J 7/00* (2006.01)
*H04W 48/20* (2009.01)
*H02J 5/00* (2006.01)
*H02J 7/02* (2006.01)

(52) U.S. Cl.
CPC ............. *H04W 48/20* (2013.01); *H02J 5/005* (2013.01); *H02J 7/0013* (2013.01); *H02J 7/025* (2013.01)

(58) Field of Classification Search
USPC ................................................. 320/108, 106
See application file for complete search history.

(56) References Cited

U.S. PATENT DOCUMENTS

| 7,443,057 | B2 | 10/2008 | Nunally | |
|---|---|---|---|---|
| 2006/0113955 | A1 | 6/2006 | Nunally | |
| 2008/0014897 | A1 | 1/2008 | Cook et al. | |
| 2009/0058358 | A1 | 3/2009 | Inoue et al. | |
| 2009/0224856 | A1 | 9/2009 | Karalis et al. | |
| 2009/0251008 | A1* | 10/2009 | Sugaya | 307/104 |
| 2009/0284245 | A1* | 11/2009 | Kirby et al. | 323/318 |
| 2010/0081378 | A1* | 4/2010 | Kawamura | 455/41.1 |
| 2011/0140537 | A1* | 6/2011 | Takei | 307/104 |

FOREIGN PATENT DOCUMENTS

| JP | 2004222457 A | 8/2004 |
|---|---|---|
| JP | 2005-006440 A | 1/2005 |
| JP | 2008-312294 A | 12/2008 |
| WO | WO 2010050008 A1 * | 5/2010 |

* cited by examiner

*Primary Examiner* — Richard Isla Rodas
*Assistant Examiner* — David V Henze-Gongola

(57) ABSTRACT

Disclosed is a charging method of a multi-node wireless charging system using magnetic field communication capable of effectively charging a plurality of nodes using the magnetic field communication. The magnetic field communication protocol for wireless charging is prepared and thus, an appropriate wireless charging device may be selected and charged for an appropriate time. The wireless charging method of the present invention includes: transmitting an association request frame; receiving an association response frame from the wireless charging devices; transmitting a charging requirement request frame; receiving a charging requirement response frame from the wireless charging devices; transmitting a charging preparation request frame; and transmitting power during a receiving period of the charging preparation response frame for the charging preparation request frame.

13 Claims, 8 Drawing Sheets

CHARGING METHOD OF MULTI-NODE WIRELESS CHARGING SYSTEM USING MAGNETIC FIELD COMMUNICATION

CROSS-REFERENCE TO RELATED APPLICATIONS

This application claims priority under 35 U.S.C. §119 to Korean Patent Application No. 10-2010-0139395, filed on Dec. 30, 2011, in the Korean Intellectual Property Office, the disclosure of which is incorporated herein by reference in its entirety.

TECHNICAL FIELD

The present invention relates to a wireless charging system, and more particularly, to a charging method of a multi-node wireless charging system using magnetic field communication capable of effectively charging a plurality of nodes using the magnetic field communication.

BACKGROUND

A wireless charging system using a magnetic induction phenomenon as wireless power transmission technologies wirelessly transmitting energy has been used.

For example, an electric toothbrush, a cordless razor, or the like, is charged by a principle of electromagnetic induction. In recent years, wireless charging products capable of charging portable devices such as mobile phones, PDAs, MP3 players, notebook computers, or the like, using the electromagnetic induction have been released.

However, the magnetic induction scheme inducing current through magnetic field from a single coil to another coil is very sensitive to a distance between the coils and a relative position of the coils to sharply degrade transmission efficiency even when the distance between two coils are slightly spaced or twisted from each other. Therefore, the wireless charging system according to the magnetic induction scheme may be used only in a short range of several centimeters or less.

Meanwhile, U.S. Pat. No. 7,741,734 discloses a method of wireless non-radiative energy transfer using coupling of resonant-field evanescent tails. The basis of this technique is that two same-frequency resonant objects tend to couple, while interacting weakly with other off-resonant environmental objects, which makes it possible to transfer energy farther away compared to the prior art magnetic induction scheme.

Even in the system wirelessly transmitting energy using resonance, wireless power is still transmitted to all of the receiving devices resonating with the transmitting device, which is not very effective.

SUMMARY

The present invention can prepare a magnetic field communication protocol for wireless charging and select the appropriate wireless charging device to charge the selected wireless charging device for an appropriate time.

An exemplary embodiment of the present invention provides a multi-node wireless charging method using magnetic field communication for enabling a wireless power transmission apparatus to charge wireless charging devices using magnetic field communication in a multi-node wireless power transmission system including the wireless power transmission apparatus and the plurality of wireless charging devices spaced apart from the wireless power transmission apparatus, the method including: transmitting an association request frame; receiving an association response frame from the wireless charging devices; transmitting a charging requirement request frame; receiving a charging requirement response frame from the wireless charging devices; transmitting a charging preparation request frame; and transmitting power during a receiving period of the charging preparation response frame for the charging preparation request frame.

The charging requirement response frame may include a node ID and charging data information of the wireless charging devices and the wireless charging devices receiving the charging requirement request frame may transmit the charging requirement response frame for a response period divided into a plurality of slots.

The charging requirement request frame may include a node ID of a specific wireless charging device to be charged and the charging preparation request frame may include a node ID, a slot number, and charging period information of the wireless charging devices.

The transmitting of the power may further transmit the node ID of the wireless charging devices to be charged and the receiving period of the charging requirement response frame may be divided into a plurality of slots, and the transmitting of the power may transmit power using at least one slot of the plurality of slots.

Another exemplary embodiment of the present invention provides a multi-node wireless charging method using magnetic field communication for enabling wireless charging devices to receive wireless power using magnetic field communication in a multi-node wireless power transmission system including the wireless power transmission apparatus and the plurality of wireless charging devices spaced apart from the wireless power transmission apparatus, the method including: receiving an association request frame from the wireless power transmission apparatus; transmitting an association response frame; receiving a charging requirement request frame from the wireless power transmission apparatus; transmitting a charging requirement response frame; receiving a charging preparation request frame from the wireless power transmission apparatus; and receiving power from the wireless power transmission apparatus during a receiving period of the charging preparation response frame for the charging preparation request frame.

The charging requirement request frame may include a node ID of a specific wireless charging device to be charged, and the transmitting of the charging request response frame may be performed by the wireless charging devices having a node ID coinciding with the node ID of the received charging requirement request frame.

Other features and aspects will be apparent from the following detailed description, the drawings, and the claims.

DETAILED DESCRIPTION OF EMBODIMENTS

Figure 1:
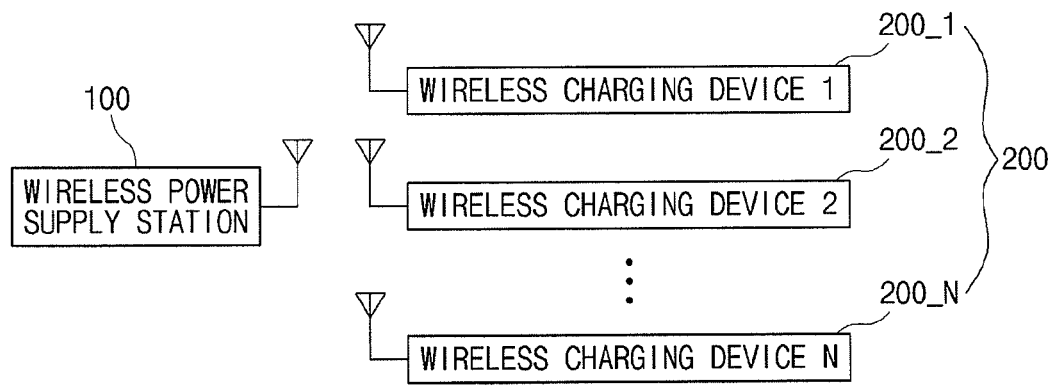
FIG. 1 is a block diagram schematically showing an overall configuration of a multi-node wireless charging system using a magnetic resonance induction scheme according to an exemplary embodiment of the present invention.

Hereinafter, exemplary embodiments will be described in detail with reference to the accompanying drawings. Throughout the drawings and the detailed description, unless otherwise described, the same drawing reference numerals will be understood to refer to the same elements, features, and structures. The relative size and depiction of these elements may be exaggerated for clarity, illustration, and convenience. The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

Hereinafter, a multi-node wireless charging system using a magnetic resonance induction scheme according to an exemplary embodiment of the present invention will be described with reference to the accompanying drawings.

As shown in FIG. 1, the multi-node wireless energy transmission system using a magnetic resonance induction scheme according to an exemplary embodiment of the present invention is configured to include a wireless power supply station 100 that wirelessly supplies power using the magnetic resonance induction scheme and a plurality of wireless charging devices 200_1, 200_2, . . . , 200_N which are apart from the wireless power supply station 100 by a predetermined distance and wirelessly receives power from the wireless power supply station 100.

The magnetic resonance induction scheme is to maximize wireless transmission efficiency of energy by resonance between a transmitter antenna and a receiver antenna. To this end, in the magnetic resonance induction scheme, a resonance channel is formed by matching a resonance frequency between the wireless power supply station 100 and the wireless charging device 200 and wireless power is transmitted through the resonance channel.

The wireless power supply station 100 may receive information on the wireless charging devices 200_1, 200_2, . . . , 200_N that include the identification information, type, position, or charging state of the charging devices through the magnetic field communication with the wireless charging devices 200_1, 200_2, . . . , 200_N and transmit power to the wireless charging devices 200_1, 200_2, . . . , 200_N based on the charging information.

The wireless power supply station 100 may be implemented by a fixing type or a mobile type. When the wireless power supply station 100 is implemented by the fixing type, the wireless power supply station 100 may be installed indoors in furniture such as a ceiling, a table, or the like, and may be installed outdoors, for example, in a bus station, a subway station, or the like, in an implant format, and the wireless power supply station 100 may be installed in mobile objects such as a vehicle, a train, a subway, or the like. When the wireless power supply station 100 is implemented by the mobile type, the wireless power supply station 100 may also be implemented by a separate mobile apparatus and may be implemented by a portion of other digital devices such as a cover for a notebook computer, or the like.

The wireless charging devices 200_1, 200_2, . . . , 200_N may include all the digital devices including a battery such as various types of mobile terminals, digital cameras, notebook computers, or the like, and may also be electronic devices such as sensors, meters that are disposed at places that are difficult to access, such as underground, underwater, the inside of buildings, or the like.

Figure 2:
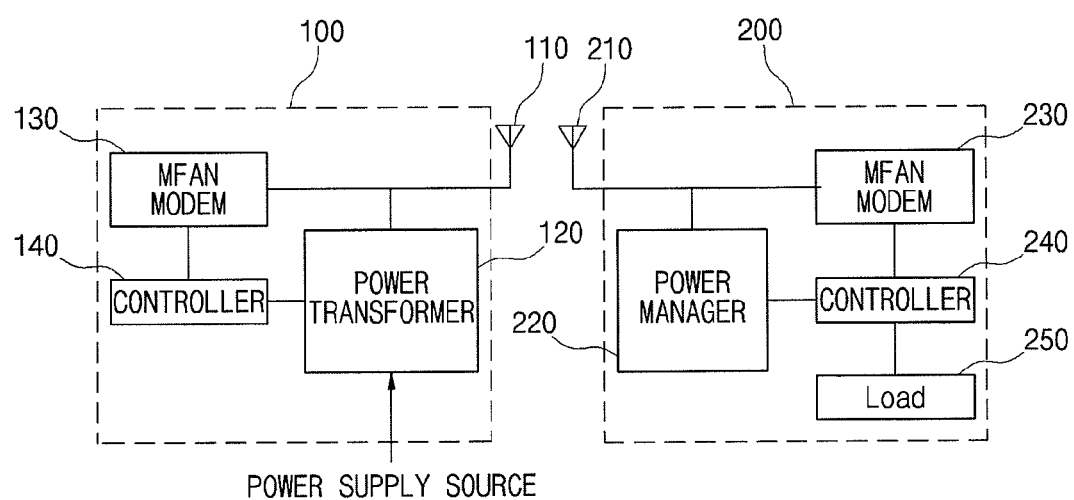
FIG. 2 is a block diagram showing configurations of a wireless power supply apparatus and a wireless charging device in the multi-node wireless charging system using a magnetic resonance induction scheme according to the exemplary embodiment of the present invention.

FIG. 2 is a block diagram showing configurations of a wireless power supply station and a wireless charging device in the multi-node wireless charging system using a magnetic resonance induction scheme according to the exemplary embodiment of the present invention.

As shown in FIG. 2, the wireless power supply station 100 of the multi-node wireless charging system using the magnetic resonance induction scheme according to the exemplary embodiment of the present invention includes a power transformer 120 that receives power from an external power supply source to transform the power into AC power having a resonance frequency band between the wireless power supply station 100 and the wireless charging device 200, a magnetic field communication modem (MFAN modem) 130 that performs the magnetic field communication with the wireless charging device 200 using a magnetic field communication protocol, a transmitter antenna 110 that transmits the AC power from the power transformer 120 and data from a magnetic field communication modem 130 to the wireless charging device 200 using the magnetic resonance induction scheme, and a controller 140 that controls components of the wireless power supply station 100 in addition to the power transformer 120 and the magnetic field communication modem 130.

The wireless charging device 200 of the multi-node wireless charging system using the magnetic resonance induction scheme according to the exemplary embodiment of the present invention includes a receiver antenna 210 that receives power and data from the wireless power supply station 100 using the magnetic resonance induction scheme, a magnetic field communication modem (MFAN modem) 230 that performs the magnetic field communication with the wireless power supply station 100 using the magnetic field communication protocol, a power manager 220 that manages reception of power, a controller 240 that controls components of the wireless charging device 200 in addition to the power manager and the magnetic field communication modem 230, and a battery (Load) 250 that is charged using the received power.

In the multi-node wireless charging system using the magnetic resonance induction scheme according to the exemplary embodiment of the present invention, the wireless power supply station 100 and the wireless charging device 200 achieve the efficient wireless charging using the magnetic field communication using the magnetic field communication modems 130 and 230.

Network components of the multi-node wireless charging system according to the exemplary embodiment of the present invention will now be described.

A magnetic field area network (MFAN) is a wireless network that uses a magnetic field signal in a low frequency band 30 KHz to 300 KHz to transmit and receive information. An operating central frequency of the wireless communication is 128 KHz and a modulation scheme uses a binary phase shift keying (BPSK) scheme or an amplitude shift keying (ASK) scheme. In order to diversify a data rate, a data rate of several Kbps is provided at a distance of several m by using Manchester coding and non-return-to-zero level (NRZ-L) coding. Devices participating in the MFAN are divided into an MFAN-coordinator (MFAN-C) and an MFAN-node (MFAN-N) according to the function thereof. Only one MFAN-C is present in a single MFAN and a plurality of MFAN-N devices form a network based on the MFAN-C. The MFAN-C manages association, separation, and release of the MFAN-N. The MFAN uses a time division multiple access (TDMA) scheme. The MFAC-C manages the connection at the MFAN and the time resource is distributed according to the determination of MFAN-C at the time of the connection of the MFAN-C.

The critical components configuring the MFAN may be divided into temporal elements and physical elements. The temporal elements mean the superframe configured by a request period, a response period, and an inactive period and the physical element means a network configured by the MFAN-C and MFAN-N. The fundamental element of the physical elements is a node. A type of nodes includes the MFAN-C that manages the network and the MFAN-N that is a component of the network.

In the multi-node wireless charging system using the magnetic field communication according to the exemplary embodiment of the present invention, the wireless power transmission station 100 becomes a coordinator and the wireless charging device 200 becomes a node.

Figure 3:
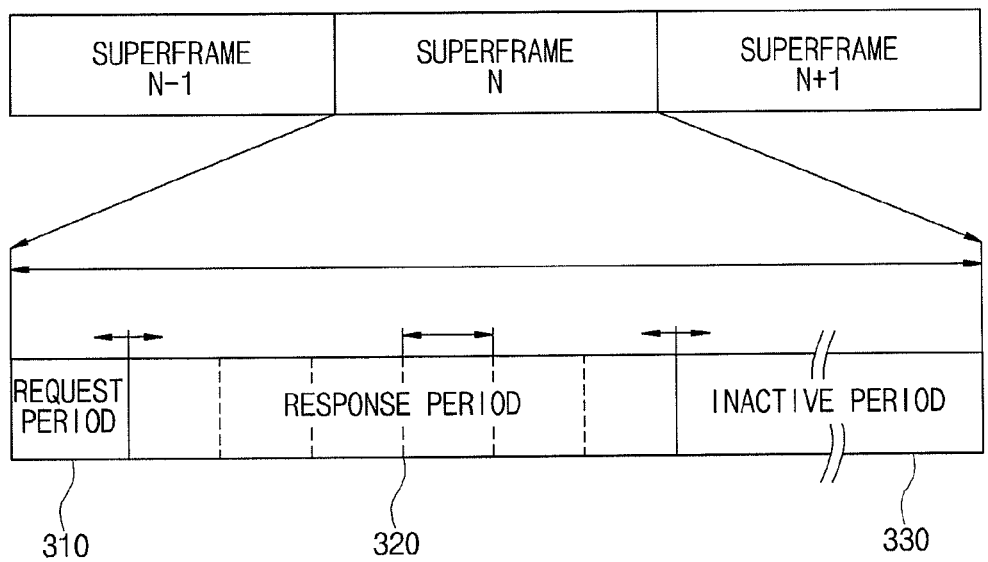
FIG. 3 is a diagram showing a structure of a superframe of the magnetic field communication according to the exemplary embodiment of the present invention.

FIG. 3 is a diagram showing a structure of a superframe of the magnetic field communication according to the exemplary embodiment of the present invention.

As shown in FIG. 3, a single superframe includes a request period, a response period, and an inactive period, wherein a length of the request period and the response period is variable. The superframe starts by allowing the coordinator to transmit a response request packet in the request period. The response request packet has information on the nodes which may transmit the response packet for the response period and the nodes use the information included in the response request packet to transmit the response packet for the response period. The node may transmit data to the coordinator in the inactive period without the request of the coordinator.

Figure 4:
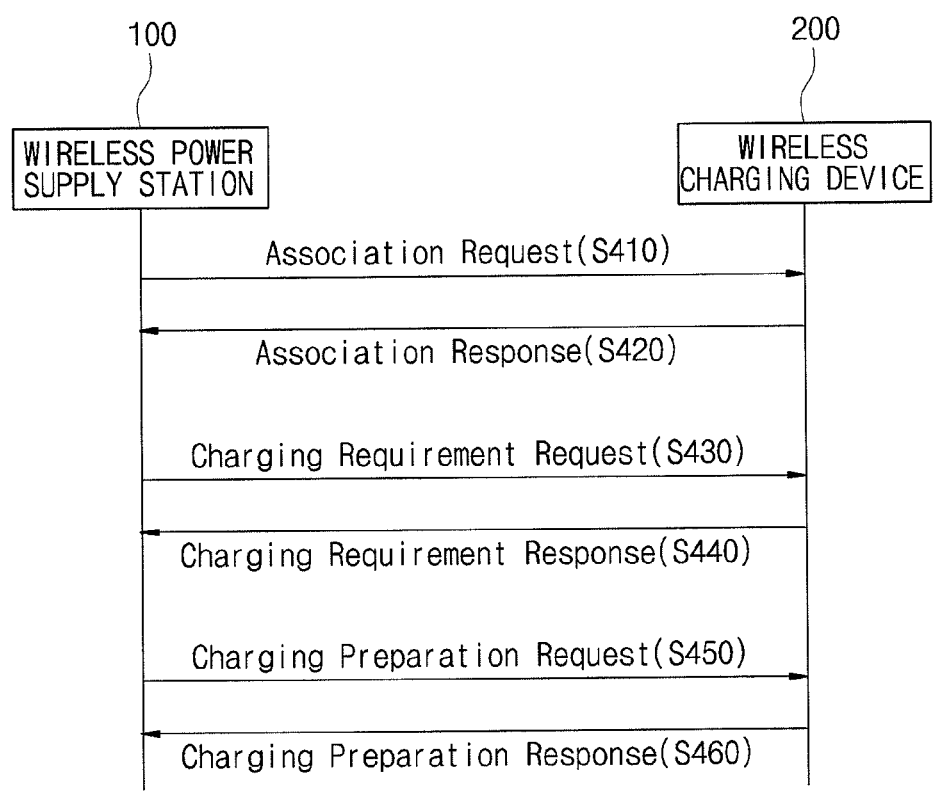
FIG. 4 is a flow chart showing a wireless charging method using magnetic field communication according to another exemplary embodiment of the present invention.

FIG. 4 is a flow chart showing a wireless charging method using magnetic field communication according to another exemplary embodiment of the present invention.

As shown in FIG. 4, the wireless power transmission station (coordinator) 100 transmits an association request (S410). Then, the wireless charging device (node) 200 within the chargeable range transmits an association response to the wireless power transmission device 100 (S420).

When the association is completed, the wireless power transmission station 100 transmits the charging requirement request (S430) and the wireless charging device 200 to be charged transmits the charging requirement response (S440).

The wireless power transmission station 100 receiving the response to the charging requirement request transmits the charging preparation request (S450) and wirelessly charges the corresponding wireless charging device 200 during the subsequent charging preparation response period of the wireless charging device 200 (S460).

Now, the structures of the charging requirement request superframe and the charging preparation request superframe will be described in more detail.

Figure 5A:
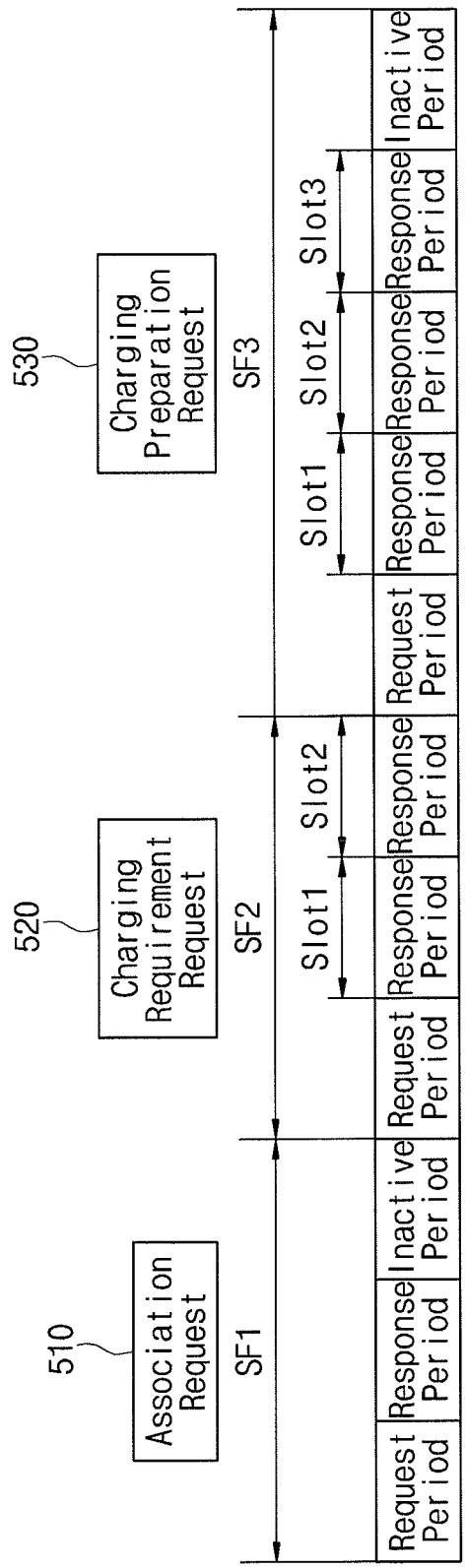
FIGS. 5A to 5C are diagrams showing a structure of a charging requirement request superframe used in the wireless charging method using magnetic field communication according to the exemplary embodiment of the present invention.
Figure 5B:
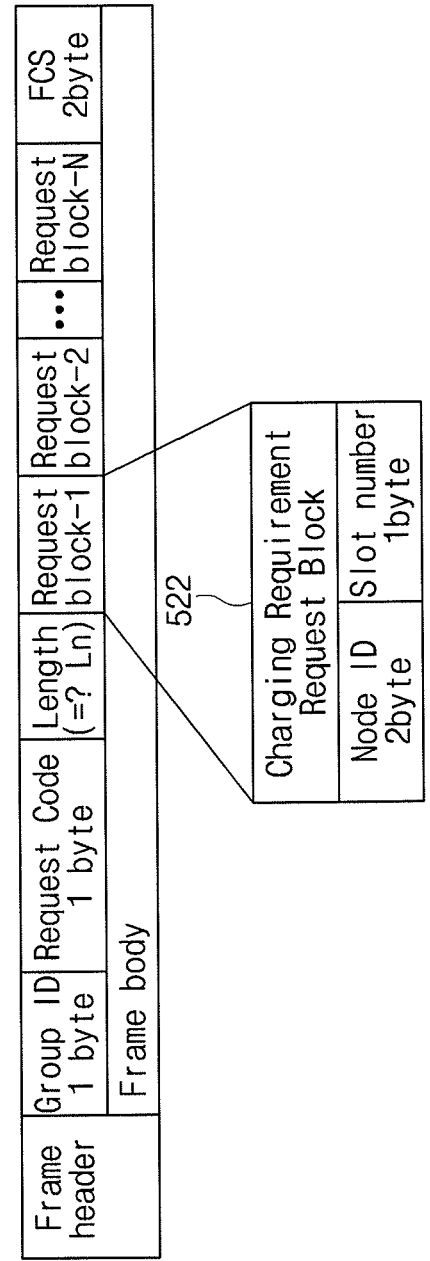
Figure 5C:
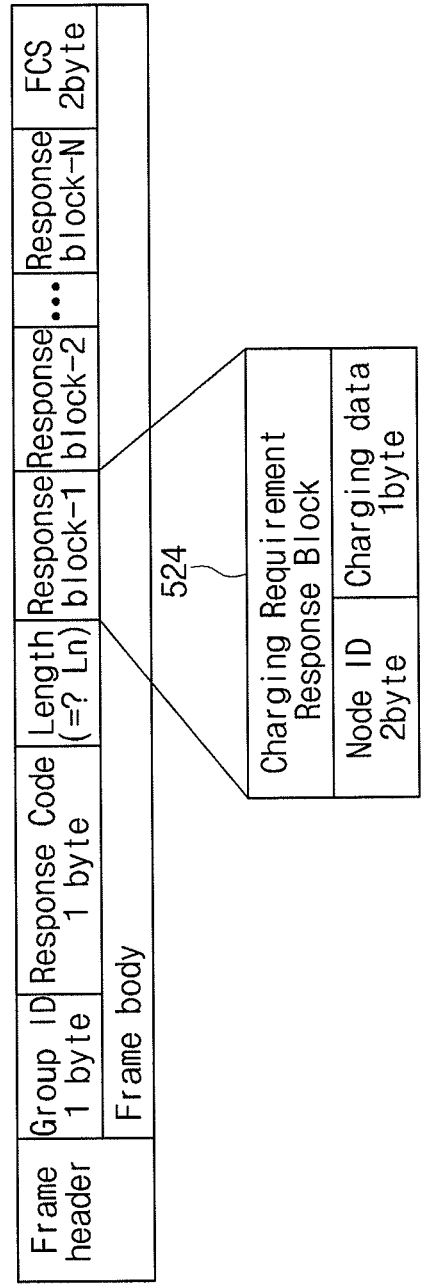

FIGS. 5A to 5C are diagrams showing a structure of a charging requirement request superframe used in the wireless charging method using magnetic field communication according to the exemplary embodiment of the present invention.

As described above, a charging requirement request 520 is performed after an association process 510 is completed. When the wireless power transmission station 100 sends the charging requirement request 522 for the request period, the wireless charging device 200 determines the received packet to transmit the charging requirement response for the response period and the wireless power transmission station 100 receives the response to the charging requirement. The charging requirement response 524 includes the node ID and the charging data information of the wireless charging device 200. The wireless power transmission station 100 may send the charging requirement request to a specific node when sending the charging requirement request packet.

Figure 6A:
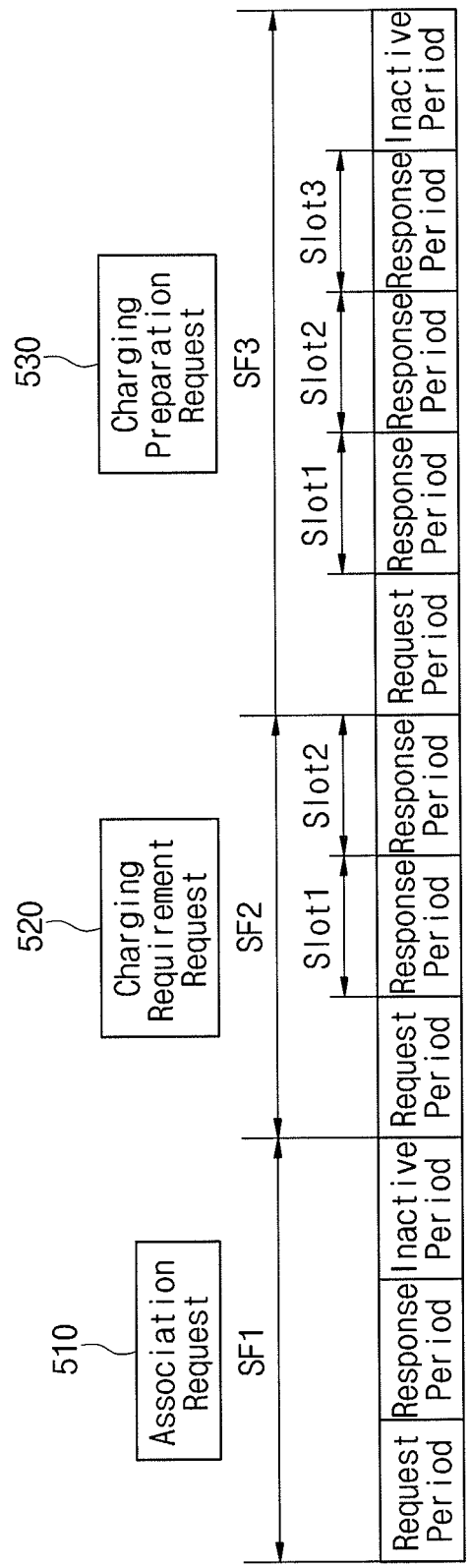
FIGS. 6A to 6C are diagrams showing a structure of a charging preparation request superframe used in the wireless charging method using magnetic field communication according to the exemplary embodiment of the present invention.
Figure 6B:
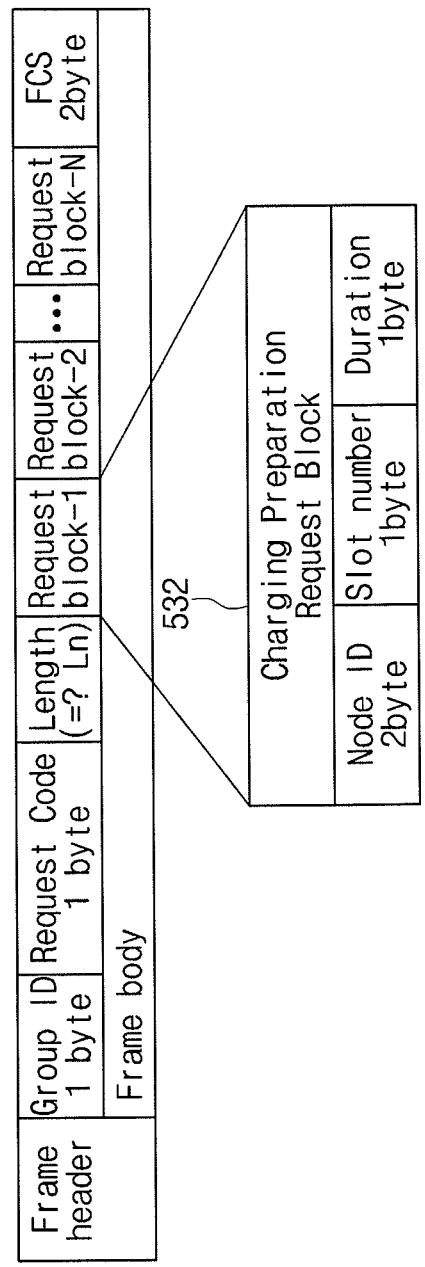
Figure 6C:
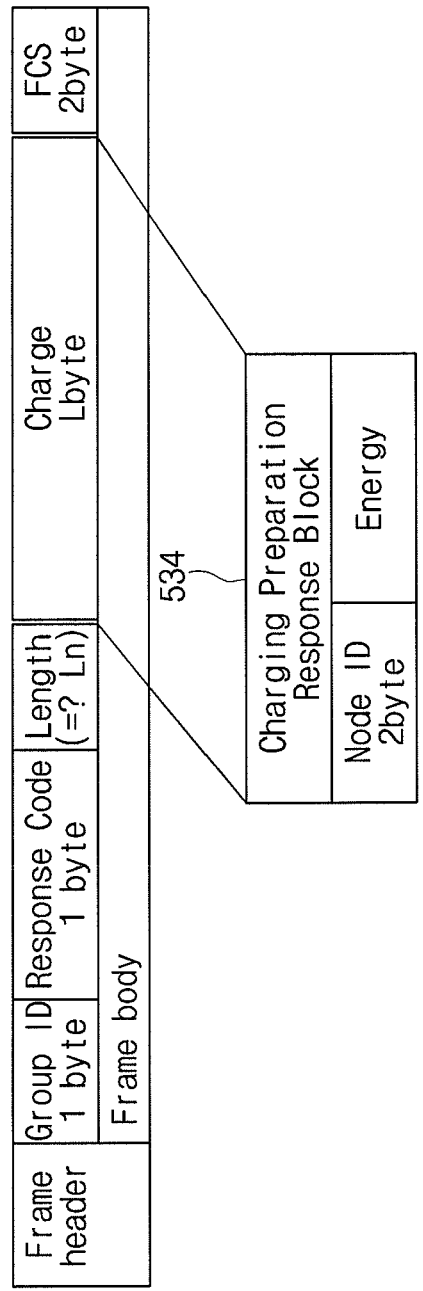

FIGS. 6A to 6C are diagrams showing a structure of a charging preparation request superframe used in the wireless charging method using magnetic field communication according to the exemplary embodiment of the present invention.

The wireless power transmission station 100 receiving the response to the charging requirement request transmits the charging preparation request 532 to the wireless charging device 200 for the request period. The charging preparation request frame 532 includes information, such as each node ID, a slot number, a charging period, or the like. The wireless power transmission station 100 sending the charging preparation request transmits energy to the wireless charging device 200 at the scheduled time during the charging preparation response period 534.

According to the exemplary embodiments of the present invention, it is possible to implement the wireless charging system using the magnetic field communication capable of efficiently managing the history and state of the charging node and controlling the wireless energy transmission time and intensity, or the like, according to the charging conditions.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A multi-node wireless charging method using magnetic field communication for enabling a wireless power transmission apparatus to charge wireless charging devices using magnetic field communication in a multi-node wireless power transmission system including the wireless power transmission apparatus and the plurality of wireless charging devices spaced apart from the wireless power transmission apparatus, the method comprising:
   transmitting an association request frame;
   receiving an association response frame from the wireless charging devices;
   transmitting a charging requirement request frame;
   receiving a charging requirement response frame from the wireless charging devices;
   transmitting a charging preparation request frame; and
   transmitting power during a receiving period associated with a charging preparation response frame corresponding to at least one of the wireless charging devices according to charging information relating to the at least one of the wireless charging devices included in the charging preparation request frame.

2. The multi-node wireless charging method of claim 1, wherein the charging requirement response frame includes a node ID and charging data information of the wireless charging device.

3. The multi-node wireless charging method of claim 1, wherein the wireless charging devices receiving the charging requirement request frame transmit the charging requirement response frame for a response period divided into a plurality of slots.

4. The multi-node wireless charging method of claim 1, wherein the charging requirement request frame includes a node ID of a specific wireless charging device to be charged.

5. The multi-node wireless charging method of claim 1, wherein the charging preparation request frame includes a node ID, a slot number, and charging period information of the wireless charging devices.

6. The multi-node wireless charging method of claim 1, wherein the transmitting of the power further transmits the node ID of the wireless charging devices to be charged.

7. The multi-node wireless charging method of claim 1, wherein the receiving period of the charging requirement response frame is divided into a plurality of slots, and
 the transmitting of the power transmits power using at least one slot of the plurality of slots.

8. A multi-node wireless charging method using magnetic field communication for enabling a wireless charging device to receive wireless power using magnetic field communication in a multi-node wireless power transmission system including the wireless power transmission apparatus and the plurality of wireless charging devices spaced apart from the wireless power transmission apparatus, the method comprising:
 receiving an association request frame from the wireless power transmission apparatus;
 transmitting an association response frame;
 receiving a charging requirement request frame from the wireless power transmission apparatus;
 transmitting a charging requirement response frame;
 receiving a charging preparation request frame from the wireless power transmission apparatus; and
 receiving power from the wireless power transmission apparatus during a receiving period associated with a charging preparation response frame corresponding to at least one of the wireless charging devices according to charging information relating to the at least one of the wireless charging devices included in the charging preparation request frame.

9. The multi-node wireless charging method of claim 8, wherein the charging requirement response frame includes a node ID and charging data information of the wireless charging devices.

10. The multi-node wireless charging method of claim 8, wherein the wireless charging devices receiving the charging requirement request frame transmit the charging requirement response frame for a response period divided into a plurality of slots.

11. The multi-node wireless charging method of claim 8, wherein the charging requirement request frame include a node ID of a specific wireless charging device to be charged, and
 the transmitting of the charging requirement response frame is performed by the wireless charging devices having a node ID coinciding with the node ID of the received charging requirement request frame.

12. The multi-node wireless charging method of claim 8, wherein the charging preparation request frame includes a node ID, a slot number, and charging period information of the wireless charging devices.

13. The multi-node wireless charging method of claim 8, wherein the receiving period of the charging requirement response frame is divided into a plurality of slots, and
 the receiving of the power receives power using at least one slot of the plurality of slots.

\* \* \* \* \*